(12) United States Patent
Yamada

(10) Patent No.: US 9,621,039 B2
(45) Date of Patent: Apr. 11, 2017

(54) POWER SUPPLY CIRCUIT

(71) Applicant: Kabushiki Kaisha Toshiba, Minato-ku, Tokyo (JP)

(72) Inventor: Manabu Yamada, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 41 days.

(21) Appl. No.: 14/638,891

(22) Filed: Mar. 4, 2015

(65) Prior Publication Data
US 2016/0013720 A1 Jan. 14, 2016

(30) Foreign Application Priority Data

Jul. 14, 2014 (JP) .................. 2014-144102

(51) Int. Cl.
*G05F 1/00* (2006.01)
*H02M 3/156* (2006.01)
*H02M 1/38* (2007.01)

(52) U.S. Cl.
CPC ............. *H02M 3/156* (2013.01); *H02M 1/38* (2013.01); *H02M 2001/385* (2013.01)

(58) Field of Classification Search
CPC ..... H02M 3/1588; H02M 3/156; H02M 3/157
USPC ................. 323/271, 282–285, 288
See application file for complete search history.

(56) References Cited

U.S. PATENT DOCUMENTS

| | | | |
|---|---|---|---|
| 2006/0152204 A1 | 7/2006 | Maksimovic et al. | |
| 2008/0164859 A1* | 7/2008 | Peng | H02M 3/157 323/318 |
| 2011/0204859 A1* | 8/2011 | Prodic | H02M 3/1588 323/271 |
| 2014/0125306 A1* | 5/2014 | Babazadeh | G05F 5/00 323/285 |

FOREIGN PATENT DOCUMENTS

| | | |
|---|---|---|
| JP | H09-121593 A | 5/1997 |
| JP | 2001-145368 A | 5/2001 |
| JP | 2010-011702 A | 1/2010 |
| JP | 2013-062952 A | 4/2013 |

* cited by examiner

*Primary Examiner* — Nguyen Tran
(74) *Attorney, Agent, or Firm* — White & Case LLP

(57) ABSTRACT

According to one embodiment, switching control section calculates a current control value based on a comparison result between a smoothed voltage of an output of a switching circuit and a target value, and controls a dead time of the switching circuit based on the current control value.

19 Claims, 9 Drawing Sheets

POWER SUPPLY CIRCUIT

CROSS-REFERENCE TO RELATED APPLICATIONS

This application is based upon and claims the benefit of priority from Japanese Patent Application No. 2014-144102, filed on Jul. 14, 2014; the entire contents of which are incorporated herein by reference.

FIELD

Embodiments described herein relate generally to a power supply circuit.

BACKGROUND

As regards a digital switching power supply circuit with PWM control, there is known an autonomous control method using a duty-cycle control value in voltage mode PWM, as a control method for optimizing the dead time of a synchronous rectifier driver.

DETAILED DESCRIPTION

In general, according to one embodiment, a power supply circuit includes a switching circuit and a switching control section. The switching control section calculate a current control value based on a comparison result between an output voltage of the smoothing circuit and a target value, and to control a dead time of the switching circuit based on the current control value.

Exemplary embodiments of a power supply circuit will be explained below in detail with reference to the accompanying drawings. The present invention is not limited to the following embodiments.

First Embodiment

Figure 1:
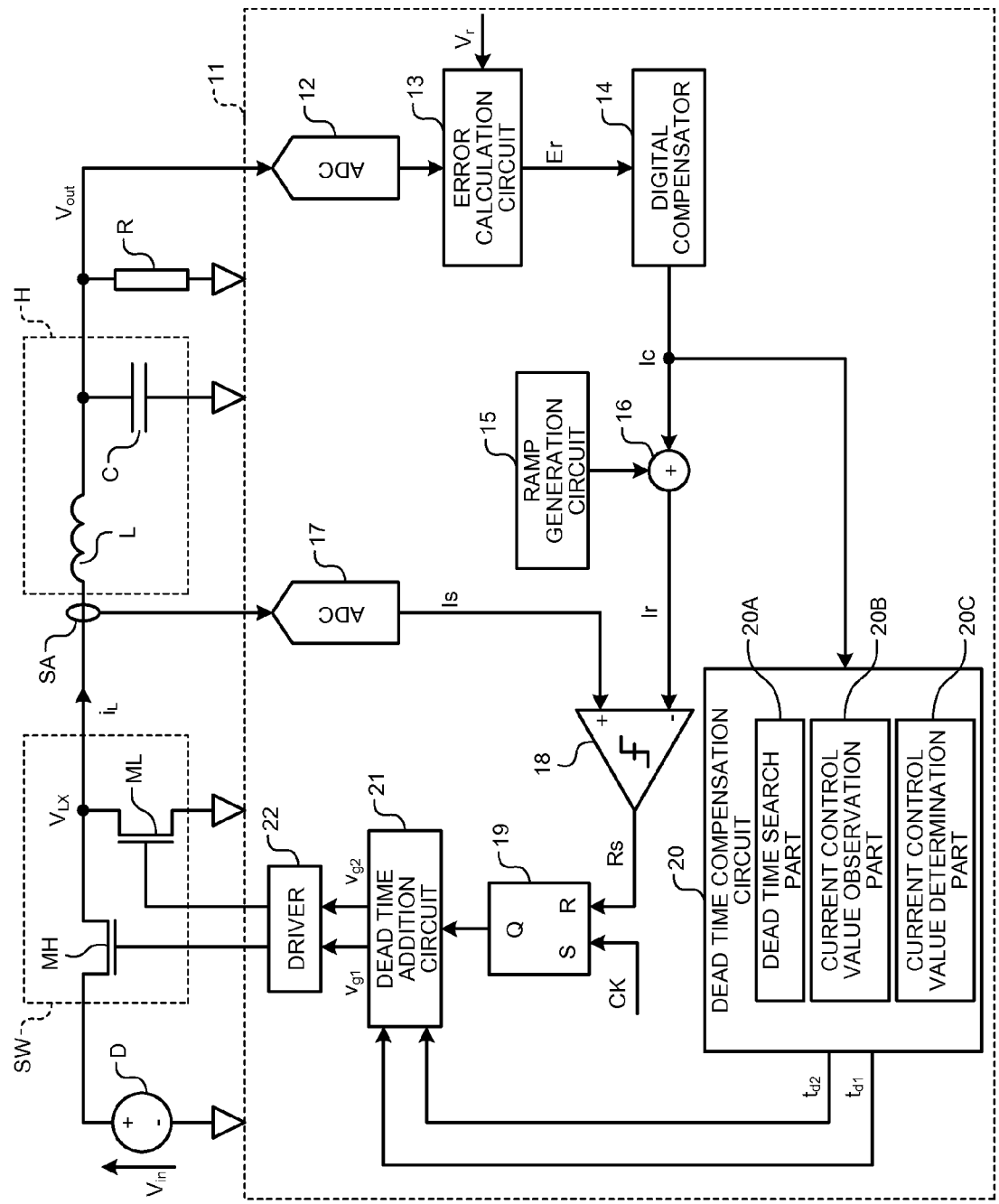
FIG. 1 is a block diagram showing a schematic configuration of a power supply circuit according to a first embodiment.

FIG. 1 is a block diagram showing a schematic configuration of a power supply circuit according to a first embodiment.

As shown in FIG. 1, the power supply circuit is provided with a direct current power supply D, a switching circuit SW, a smoothing circuit H, a current sensor SA, and a switching control section 11.

The switching circuit SW can divide a direct current generated in the direct current power supply D, and it includes a high-side switch MH and a low-side switch ML. The high-side switch MH may be formed of a p-channel field effect transistor, and the low-side switch ML may be formed of an n-channel field effect transistor.

The smoothing circuit H can smooth a direct current provided by the dividing operation by the switching circuit SW, and it includes an inductor L and a capacitor C. The high-side switch MH can supply a current to the inductor L from the direct current power supply D. The low-side switch ML can pull a current in the smoothing circuit H from ground.

Here, the source of the high-side switch MH is connected to the direct current power supply D, the drain of the high-side switch MH is connected to the drain of the low-side switch ML, and the source of the low-side switch ML is grounded. The gate of the high-side switch MH and the gate of the low-side switch ML are connected to a driver 22.

Further, the drain of the low-side switch ML is connected to one end of the inductor L, the other end of the inductor L is connected to one end of the capacitor C, and the other end of the capacitor C is grounded. Further, a load R is connected in parallel with the capacitor C.

The direct current power supply D can generate a direct current voltage Vin. The current sensor SA can detect an input current $i_L$ to be input from the switching circuit SW to the smoothing circuit H.

The switching control section 11 can calculate a current control value Ic so that an output voltage Vout of the smoothing circuit H becomes closer to a target value Vr. Then, it can control switching of the switching circuit SW based on a comparison result between the input current $i_L$ and the current control value Ic.

Here, the switching control section 11 includes an A/D converter 12 for A/D-converting the output voltage Vout of the smoothing circuit H; an error calculation circuit 13 for calculating an error Er of the A/D-converted output voltage Vout relative to the reference value Vr; a digital compensator 14 for calculating the current control value Ic so that the error Er calculated by the error calculation circuit 13 becomes closer to 0; a ramp generation circuit 15 for generating a ramp to be given to the current control value Ic before input to a digital comparator 18; an adder 16 for adding the ramp generated by the ramp generation circuit 15 to the current control value Ic; an A/D converter 17 for A/D-converting a value detected by the current sensor SA; the digital comparator 18 for comparing a digital value Is of the input current $i_L$ with the current control value Ir including the given ramp; a flip-flop 19 for generating a pulse signal having an adjusted pulse width based on a reset signal Rs output from the digital comparator 18; a dead time compensation circuit 20 for controlling dead times td1 and td2 of the switching circuit SW so that the current control value Ic becomes closer to the minimum value; a dead time addition circuit 21 for generating control voltages Vg1 and Vg2 by adding the dead times td1 and td2 to the pulse signal; and the driver 22 for generating PWM signals based on the control voltages Vg1 and Vg2 and driving the gate of the high-side switch MH and the gate of the low-side switch ML. It should be noted that the dead time td1 is a time period from the time when the high-side switch MH is turned off to the time when the low-side switch ML is turned on, and the dead time td2 is a time period from the time when the low-side switch ML is turned off to the time when the high-side switch MH is turned on.

The ramp generation circuit 15 can start generating the ramp for the current control value Ic so that a time period, from the start point when the ramp is given to the current control value Ic to the matching point when the current control value Ir including the given ramp becomes equal to the digital value Is of the input current $i_L$, depends only on the duty-cycle of the switching circuit SW.

The dead time compensation circuit 20 is equipped with a dead time search part 20A, a current control value observation part 20B, and a current control value determination part 20C. The dead time search part 20A can search for the dead times of the switching circuit SW. The current control value observation part 20B can observe the current control value Ic when the dead times of the switching circuit SW have been searched for. The current control value determination part 20C can determine whether the current control value Ic is minimum based on a comparison result between the current control value Ic observed at a previous time and the current control value Ic observed at a present time.

With this configuration, the high-side switch MH and the low-side switch ML are turned on/off in a complementary manner to each other by PWM signals output from the driver 22. In this respect, when the high-side switch MH is turned on, the low-side switch ML is turned off, and the input current $i_L$ is supplied from the direct current power supply D through the high-side switch MH to the inductor L. Consequently, the input current $i_L$ is raised and an electric charge is supplied to the capacitor C, along with which the output voltage Vout is changed.

On the other hand, when the high-side switch MH is turned off, the low-side switch ML is turned on, and the input current supplied to the inductor L is lowered. Consequently, the electric charge accumulated in the capacitor C is discharged through the load R, along with which the output voltage Vout is changed. At this time, the dead times td1 and td2 are added to the PWM signals so that the high-side switch MH and the low-side switch ML are prevented from being turned on simultaneously with each other.

Then, the output voltage Vout of the smoothing circuit H is A/D-converted by the A/D converter 12, and is then subjected to subtraction with the reference value Vr by the error calculation circuit 13, by which an error Er is calculated and input to the digital compensator 14.

Then, the current control value Ic is calculated by the digital compensator 14 so that the error Er becomes closer to 0, and the current control value Ic is output from the adder 16. On the other hand, a ramp to be given to the current control value Ic is generated by the ramp generation circuit 15 and is output to the adder 16. Then, the ramp generated by the ramp generation circuit 15 is added to the current control value Ic, by which the current control value Ir is calculated and is input to the digital comparator 18. Further, on the other hand, the input current $i_L$ is detected by the current sensor SA. Then, this detected value is A/D-converted by the A/D converter 17, by which the digital value Is of the input current $i_L$ is generated and is input to the digital comparator 18. Then, when the digital value Is of the input current $i_L$ becomes equal to the current control value Ir in the digital comparator 18, the reset signal Rs is caused to rise and the flip-flop 19 is reset. In the flip-flop 19, a pulse signal is generated in such a way that, when a clock CK rises, an output Q is caused to rise, and when the reset signal Rs rises, the output Q is caused to fall. Then, the dead times td1 and td2 are added to the pulse signal by the dead time addition circuit 21, by which the control voltages Vg1 and Vg2 are generated and are output to the driver 22. Then, the PWM signals are generated by the driver 22 based on the control voltages Vg1 and Vg2, by which the high-side switch MH and the low-side switch ML are driven.

Here, in the dead time compensation circuit 20, the dead times td1 and td2 are searched for, during which the current control value Ir is observed. Then, when the current control value Ic is judged as being the minimum value, the dead times td1 and td2 are detected and these dead times td1 and td2 are output to the dead time addition circuit 21.

Here, since the dead times td1 and td2, obtained when the current control value Ic is judged as being the minimum value, are added to the PWM signals, the dead times td1 and td2 can be optimized without measurement of the duty-cycle, and the conversion efficiency in the current mode can be improved.

Further, if the fluctuations of the output voltage Vout are within the zero error range (Zero-error bin) of the digital compensator 14, the current control value Ic is constant in a steady state. On the other hand, even if the fluctuations of the output voltage Vout are within the zero error range (Zero-error bin) of the digital compensator 14, fluctuations of the duty-cycle are generated by current waveform noises. Thus, when the dead times td1 and td2 are optimized by use of the current control value Ic, there is no need to use a duty-cycle measurement value. Consequently, even if fluctuations of the duty-cycle are generated by current waveform noises, the current control value Ic is never buried in the fluctuations due to the noises, and so the optimization process of the dead times td1 and td2 can be achieved more stably.

Figure 2:
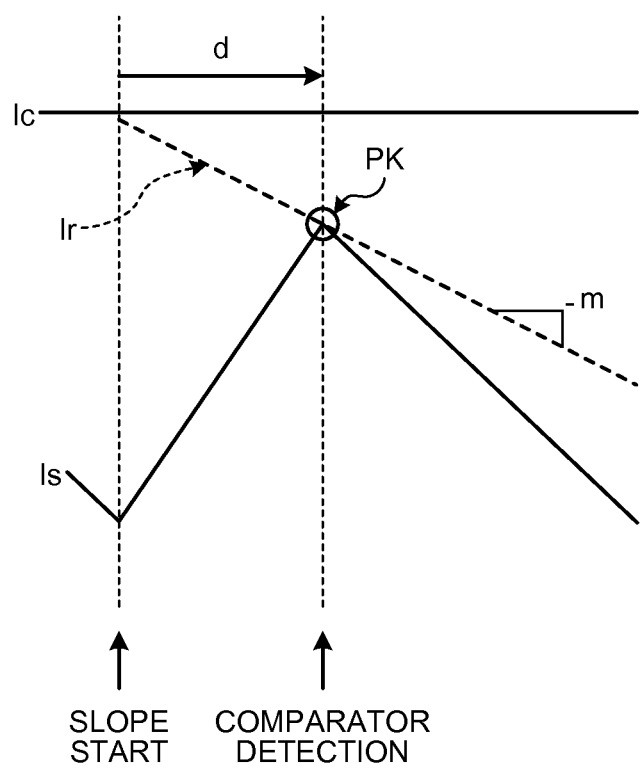
FIG. 2 is a timing chart showing an input current waveform and a typical waveform of a current control value.

FIG. 2 is a timing chart showing an input current (inductor current) waveform and a typical waveform of the current control value.

As shown in FIG. 2, in the steady state, the current control value Ic is constant. Here, where "-m" denotes the ramp generated by the ramp generation circuit 15, the current control value Ir is generated by giving this ramp to the current control value Ic. Then, where "d" denotes the duty-cycle of the high-side switch MH, the high-side switch MH is kept turned on for a time period given by the duty-cycle "d". Then, when the high-side switch MH is kept turned on, the digital value Is of the input current $i_L$ is increased. Then, when the digital value Is of the input current $i_L$ becomes equal to the current control value Ir at the peak PK, this time point is detected by the digital comparator 18. At this time, the reset signal Rs is caused to fall, by which the high-side switch MH is turned off, and the digital value Is of the input current $i_L$ is changed from increase to decrease.

Here, since the ramp is given to the current control value Ic, the current control value Ir is caused to decrease along with increase in the duty-cycle "d". Consequently, even if the current control value Ic includes some deviation, detection of a point where the digital value Is of the input current $i_L$ becomes equal to the current control value Ir can be achieved more stably.

Further, although the current control value Ic is a function of (PK+m×d), if the ramp "m" is set constant, the term of "m×d" depends on the duty-cycle "d" and the duty-cycle "d" becomes minimum at an optimum dead time. Accordingly, it is preferable for a time period, from the start point (slope start) when the ramp "m" is given to the current control value Ic to the matching point (comparator detection) when the current control value Ir becomes equal to the digital value Is of the input current $i_L$, to depend only on the duty-cycle "d".

Figure 3A:
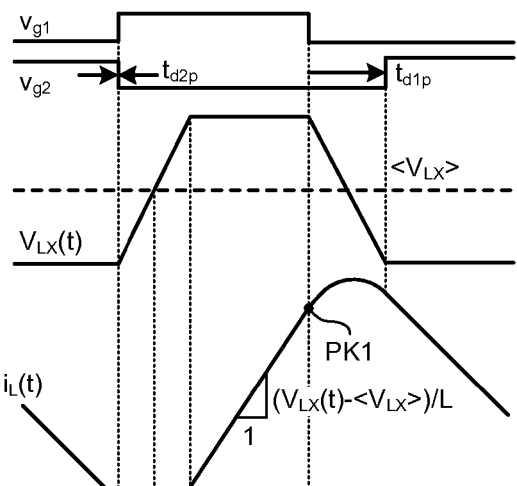
FIGS. 3A to 3C are timing charts showing the relationship between an inductor current and a switching node voltage, obtained when a dead time td1 is changed.
Figure 3B:
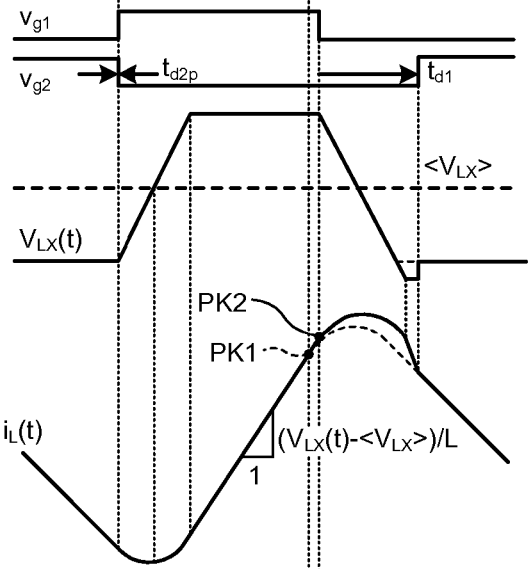
Figure 3C:
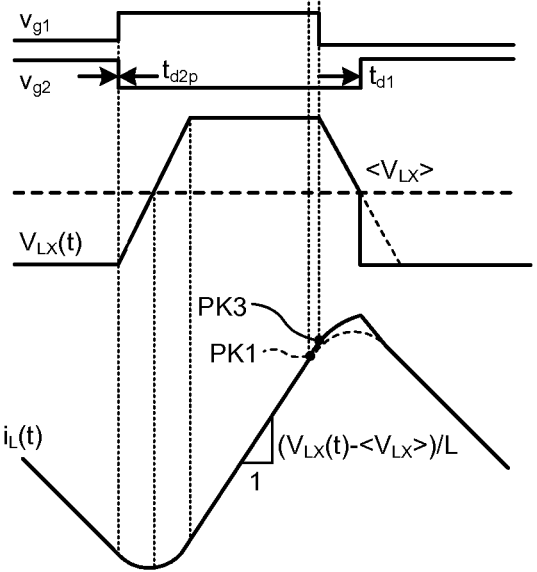

FIGS. 3A to 3C are timing charts showing the relationship between the inductor current and the switching node voltage, obtained when the dead time td1 is changed. FIG. 3A shows the switching node voltage $V_{LX}$ and the waveform of the input current $i_L$, which correspond to an optimum dead time td1p from a fall of vg1 to a rise of vg2 and an optimum dead time td2p from a fall of vg2 to a rise of vg1. Here, $<V_{LX}>$ is an average value of the switching node voltage $V_{LX}$. FIG. 3B shows the switching node voltage $V_{LX}$ and the waveform of the input current iL, which correspond to an example where the dead time td1 is too long and a current flows in the body diode of the low-side switch ML of the synchronous rectifier. FIG. 3C shows the switching node voltage $V_{LX}$ and the waveform of the input current iL, which correspond to an example where the dead time td1 is too short and a through-current flows in the synchronous rectifier. At this time, the ramp of the input current $i_L$ is always expressed by $(V_{LX}-<V_{LX}>)/L$. Further, each of FIGS. 3B and 3C shows its own waveform of the input current $i_L$ together with an overlapped broken line that represents the waveform of the input current $i_L$ corresponding to the optimum dead time td1p. The waveform of the input current $i_L$ becomes slightly larger in average value when the dead time td1 is not optimized than when it is optimized, and so the entirety of the current waveform is very slightly shifted downward due to the electric charge balance, if the load current is constant. However, in practice, this current waveform is shifted downward only by an ignorable degree, as compared with the LSB of A/D converters in current value. Accordingly, as regards peaks PK1 to PK3 detected by the digital comparator 18, the peak becomes slightly higher when the dead time td1 is not optimized than when it is optimized.

Figure 4A:
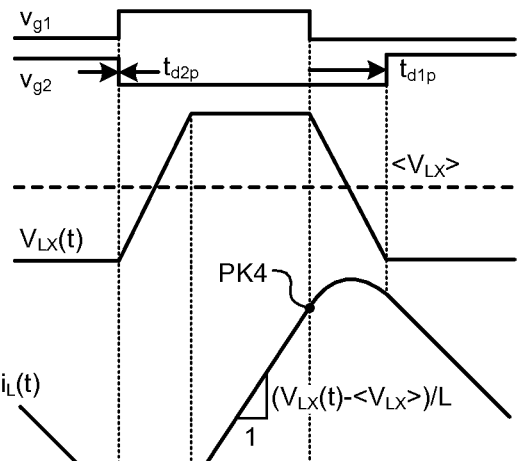
FIGS. 4A to 4C are timing charts showing the inductor current and the switching node voltage, obtained when a dead time td2 is changed.
Figure 4B:
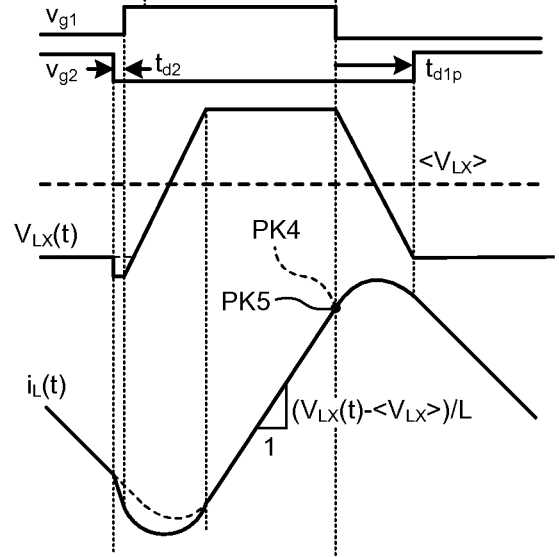
Figure 4C:
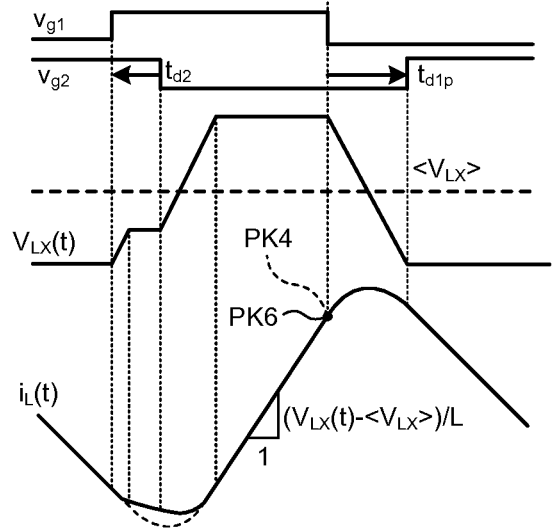

FIGS. 4A to 4C are timing charts showing the inductor current and the switching node voltage, obtained when the dead time td2 is changed. FIG. 4A shows the switching node voltage $V_{LX}$ and the waveform of the input current $i_L$, which correspond to the optimum dead times td1p and td2p. FIG. 4B shows the switching node voltage $V_{LX}$ and the waveform of the input current iL, which correspond to an example where the dead time td2 is too long and a current flows in the body diode of the low-side switch ML of the synchronous rectifier. FIG. 4C shows the switching node voltage $V_{LX}$ and the waveform of the input current iL, which correspond to an example where the dead time td2 is too short and a through-current flows in the synchronous rectifier. At this time, the ramp of the input current $i_L$ is always expressed by $(V_{LX}-<V_{LX}>)/L$. Further, each of FIGS. 4B and 4C shows its own waveform of the input current $i_L$ together with an overlapped broken line that represents the waveform of the input current $i_L$ corresponding to the optimum dead time td2p. Also in this case, if the load current is constant, the current waveform is very slightly shifted upward or downward due to the electric charge balance, but this shift is only by an ignorable degree. Accordingly, peaks PK4 to PK6 detected by the digital comparator 18 are not changed in any state. Thus, when both of the dead times td1 and td2 respectively take optimum values, (PK+m×d) becomes minimum, and so the current control value Ic is also expected to take the minimum value.

Figure 5:
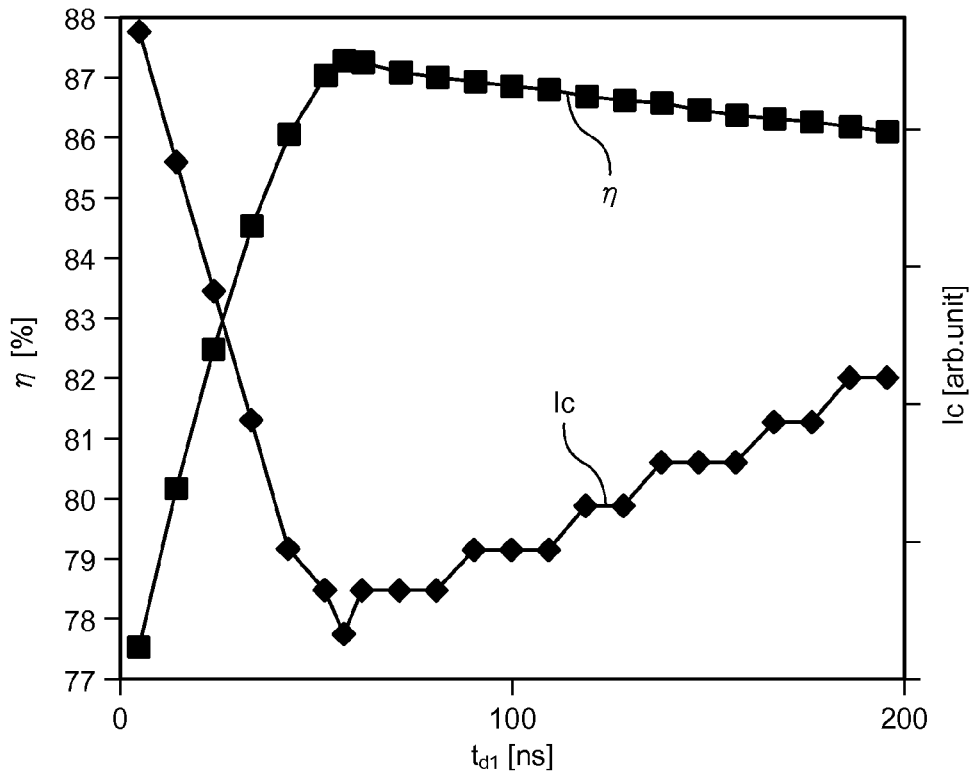
FIG. 5 is a view showing conversion efficiency and the current control value, obtained when the dead time td1 is changed.

FIG. 5 is a view showing conversion efficiency and the current control value, obtained when the dead time td1 is changed.

FIG. 5 was obtained in practice where the dead time td2 was fixed and the dead time td1 was changed, under conditions of the input voltage Vin=5V, the output voltage Vout=1.8V, L=4.7 uH, C=188 uF, the switching frequency=200 kHz, and the load current Iload=3 A. It can be seen in FIG. 5 that the minimum point of the current control value Ic agrees with the maximum point of the conversion efficiency η.

Figure 6:
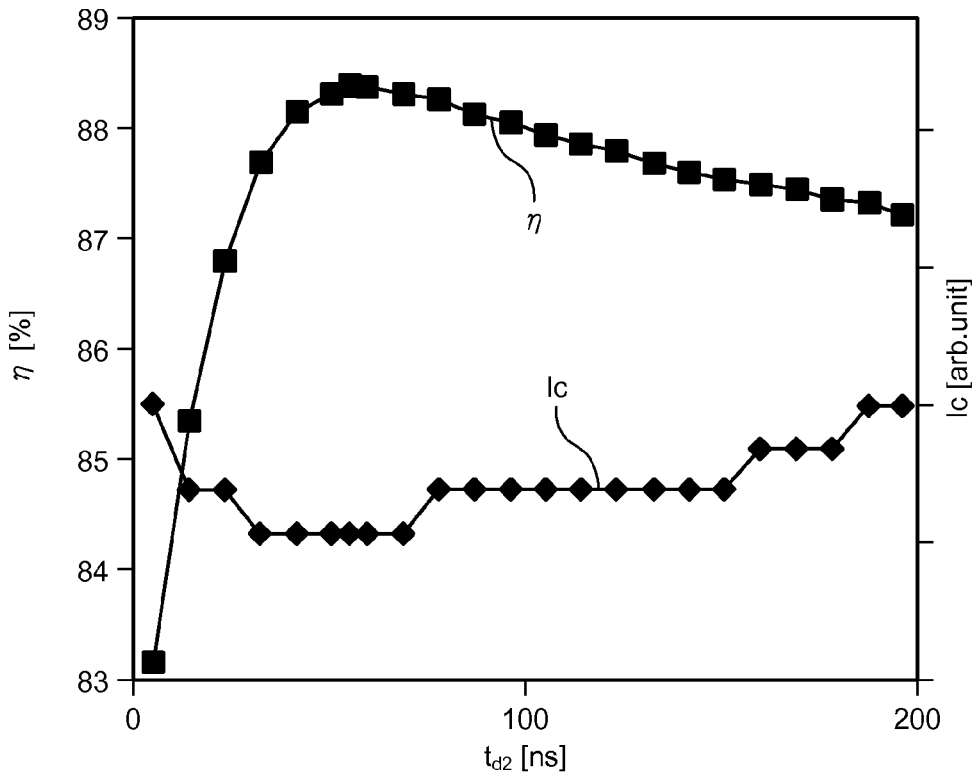
FIG. 6 is a view showing conversion efficiency and the current control value, obtained when the dead time td2 is changed.

FIG. 6 is a view showing conversion efficiency and the current control value, obtained when the dead time td2 is changed.

FIG. 6 was obtained where the dead time td1 was fixed at the optimum value and the dead time td2 was changed, under the same conditions as those of FIG. 5. It can be seen in FIG. 6 that the minimum point of the current control value Ic agrees with the maximum point of the conversion efficiency η.

Second Embodiment

Figure 7:
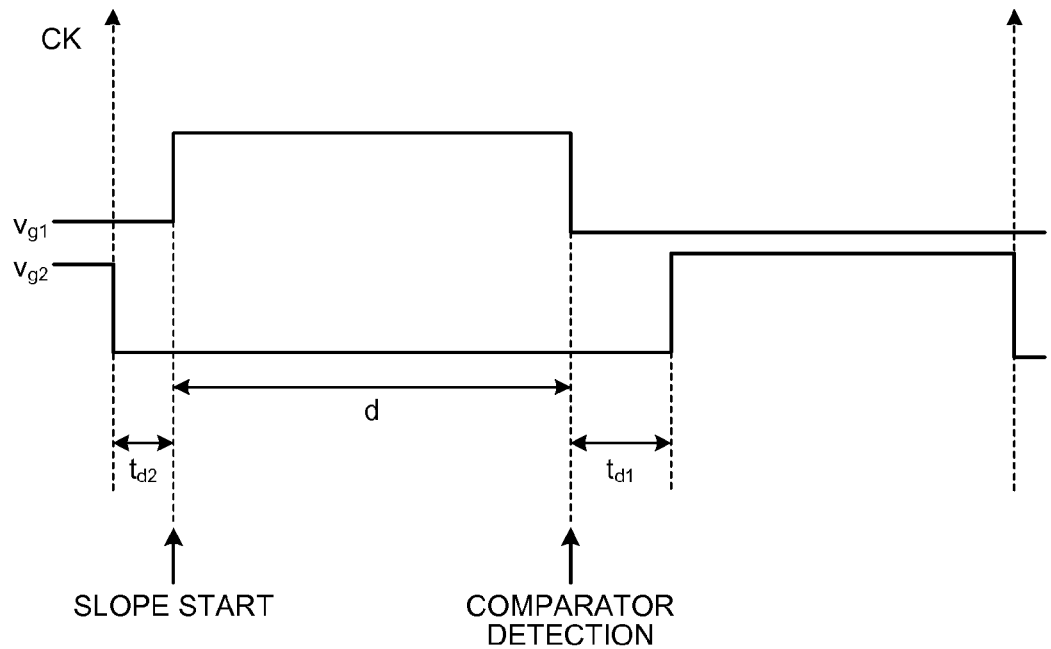
FIG. 7 is a timing chart showing control voltage waveforms from slope start to comparator detection in a power supply circuit according to a second embodiment.

FIG. 7 is a timing chart showing control voltage waveforms from the slope start to the comparator detection in a power supply circuit according to a second embodiment.

As shown in FIG. 7, the control voltage vg1 turns on the high-side switch MH after the lapse of the dead time td2 from the rise of the clock CK, and turns off it at the detection by the digital comparator 18. The control voltage vg2 turns off the low-side switch ML at the rise of the clock CK, and turns on it after the lapse of the dead time td1 from the detection by the digital comparator 18. In this case, the slope start point by the ramp generation circuit 15 is delayed by that much corresponding to the dead time td2 from the time point when the low-side switch ML is turned off so that the time period from the slope start to the comparator detection can be made dependent only on the duty-cycle "d".

Third Embodiment

Figure 8:
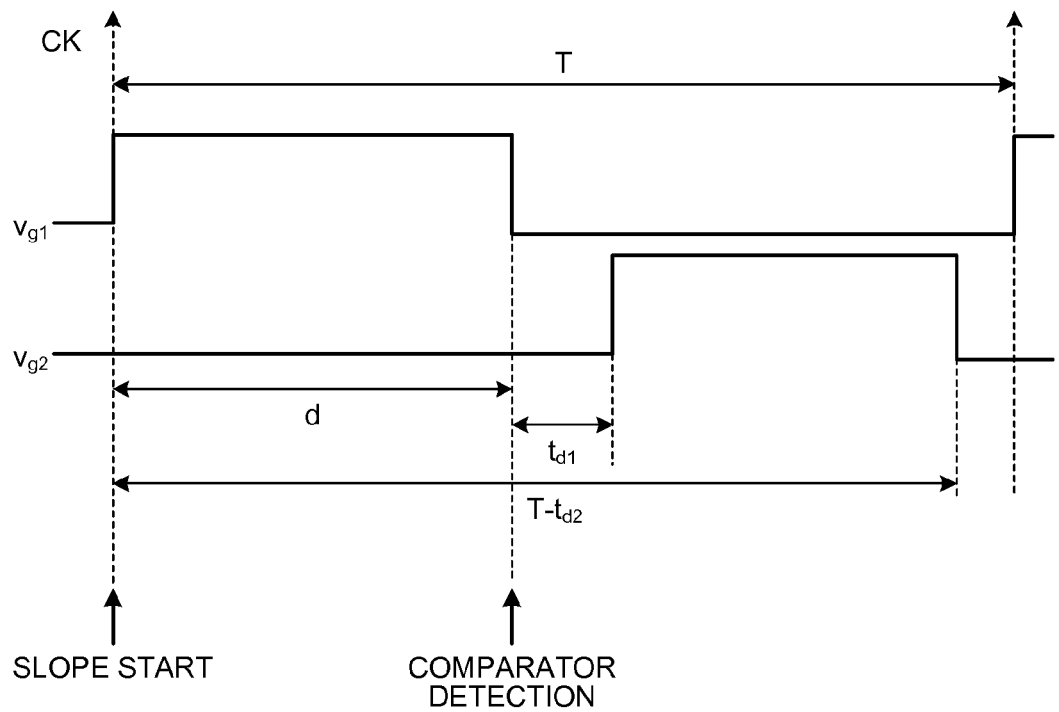
FIG. 8 is a timing chart showing control voltage waveforms from slope start to comparator detection in a power supply circuit according to a third embodiment.

FIG. 8 is a timing chart showing control voltage waveforms from the slope start to the comparator detection in a power supply circuit according to a third embodiment.

As shown in FIG. 8, the control voltage vg1 turns on the high-side switch MH at the rise of the clock CK, and turns off it at the detection by the digital comparator 18. The control voltage vg2 turns on the low-side switch ML after the lapse of the dead time td1 from the detection by the digital comparator 18, and turns off it after the lapse of (T-td2) from the rise of the clock CK. Here, "T" denotes a switching cycle. In this case, the slope start point by the ramp generation circuit 15 is fixed without reference to the dead time td2 so that the time period from the slope start to the comparator detection can be made dependent only on the duty-cycle "d".

Fourth Embodiment

Figure 9:
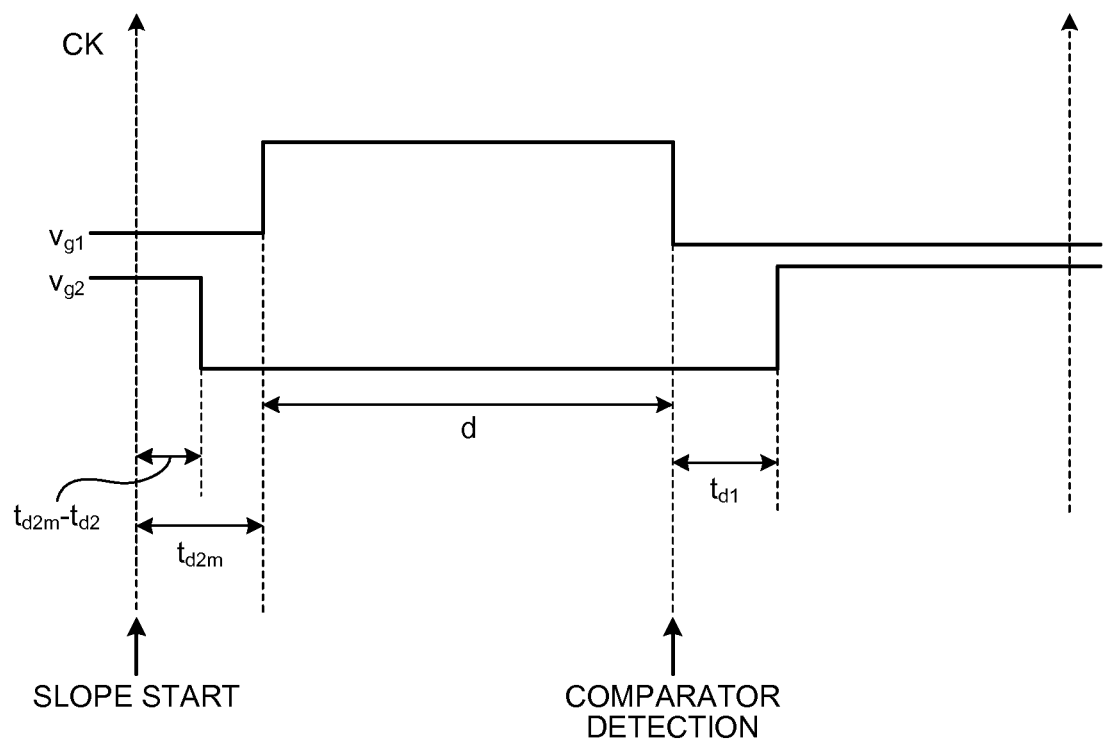
FIG. 9 is a timing chart showing control voltage waveforms from slope start to comparator detection in a power supply circuit according to a fourth embodiment.

FIG. 9 is a timing chart showing control voltage waveforms from the slope start to the comparator detection in a power supply circuit according to a fourth embodiment.

As shown in FIG. 9, the control voltage vg1 turns on the high-side switch MH after the lapse of the maximum value td2m of the dead time td2 from the rise of the clock CK, and turns off it at the detection by the digital comparator 18. The control voltage vg2 turns off the low-side switch ML after the lapse of (td2m−td2) from the rise of the clock CK, and turns on it after the lapse of the dead time td1 from the detection by the digital comparator 18. In this case, the slope start point by the ramp generation circuit 15 is fixed without reference to the dead time td2 so that the time period from the slope start to the comparator detection can be made dependent only on the duty-cycle "d".

Fifth Embodiment

Figure 10:
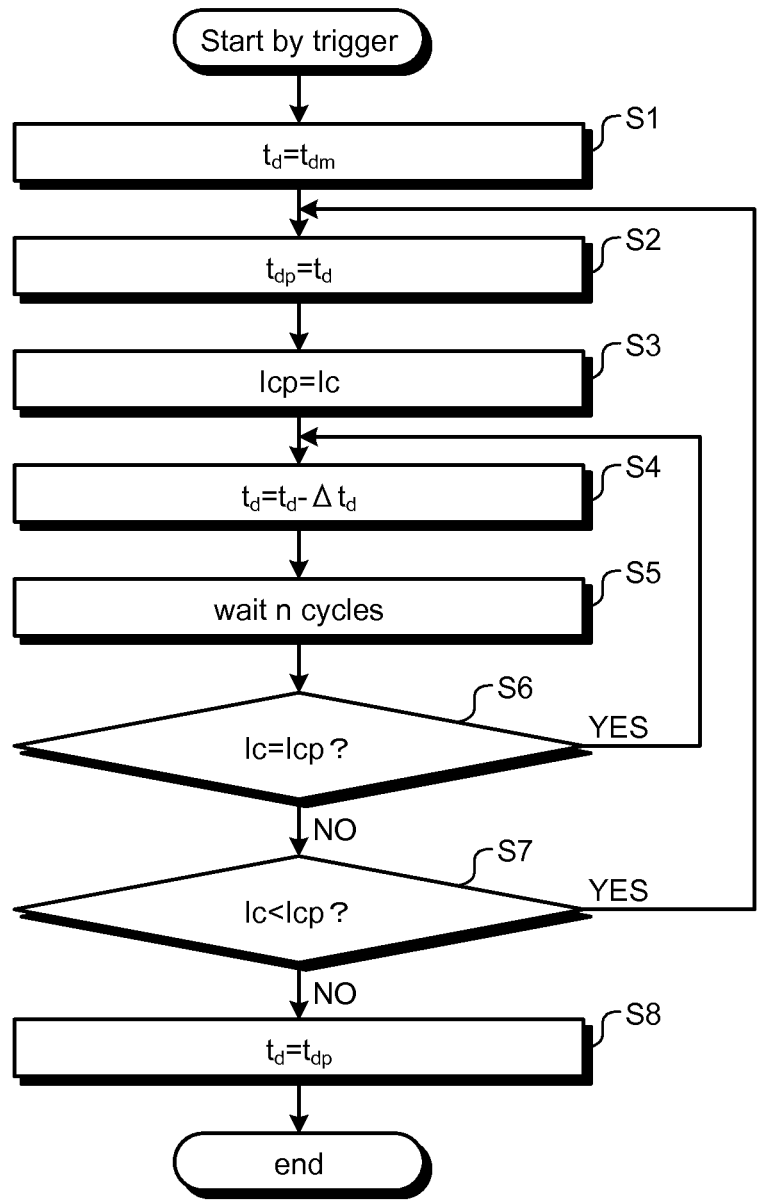
FIG. 10 is a flow chart showing an operation of optimizing a dead time in a power supply circuit according to a fifth embodiment.

FIG. 10 is a flow chart showing an operation of optimizing a dead time in a power supply circuit according to a fifth embodiment. Here, td denotes a dead time, which may be td1 or may be td2. Further, tdm denotes the maximum value of the dead time td, tdp denotes an optimum dead time, and Icp denotes an optimum value of the current control value Ic.

As shown in FIG. 10, at regular intervals or when a trigger indicating a load change is given, the dead time td is reset to the maximum value tdm in (S1). Then, the dead time td is set to the optimum dead time tdp in (S2), and the current control value Ic is set to the optimum value Icp in (S3). Then, the dead time td is reduced by a minute value Δtd in (S4), and waiting is performed for a period of "n" cycles ("n" is a positive integer) in (S5). Here, "n" can be set in consideration of a time period for the current control value Ic to be settled in a steady state after the dead time td is reduced by the minute value Δtd. Then, a judgment is made as to whether the current control value Ic is equal to the optimum value Icp in (S6), and, if it is equal, the flow returns to S4 and repeats the processes of S4 to S6. On the other hand, the current control value Ic is not equal to the optimum value Icp, a judgment is made as to whether the current control value Ic is smaller than the optimum value Icp in (S7), and, if it is smaller, the flow returns to S2 and repeats the processes of S2 to S7. On the other hand, if the current control value Ic is not smaller than the optimum value Icp, the dead time td is set to the optimum dead time tdp in (S8).

According to this method, when a trigger is given, optimization of the dead time td can be started from the maximum value tdm. Here, as can be seen in FIGS. 5 and 6, if the dead time td is too short, the conversion efficiency η is significantly lowered. Accordingly, for the sake of safety, the dead time td may take the maximum value within the range of the dead time td where the current control value Ic becomes minimum.

Sixth Embodiment

Figure 11:
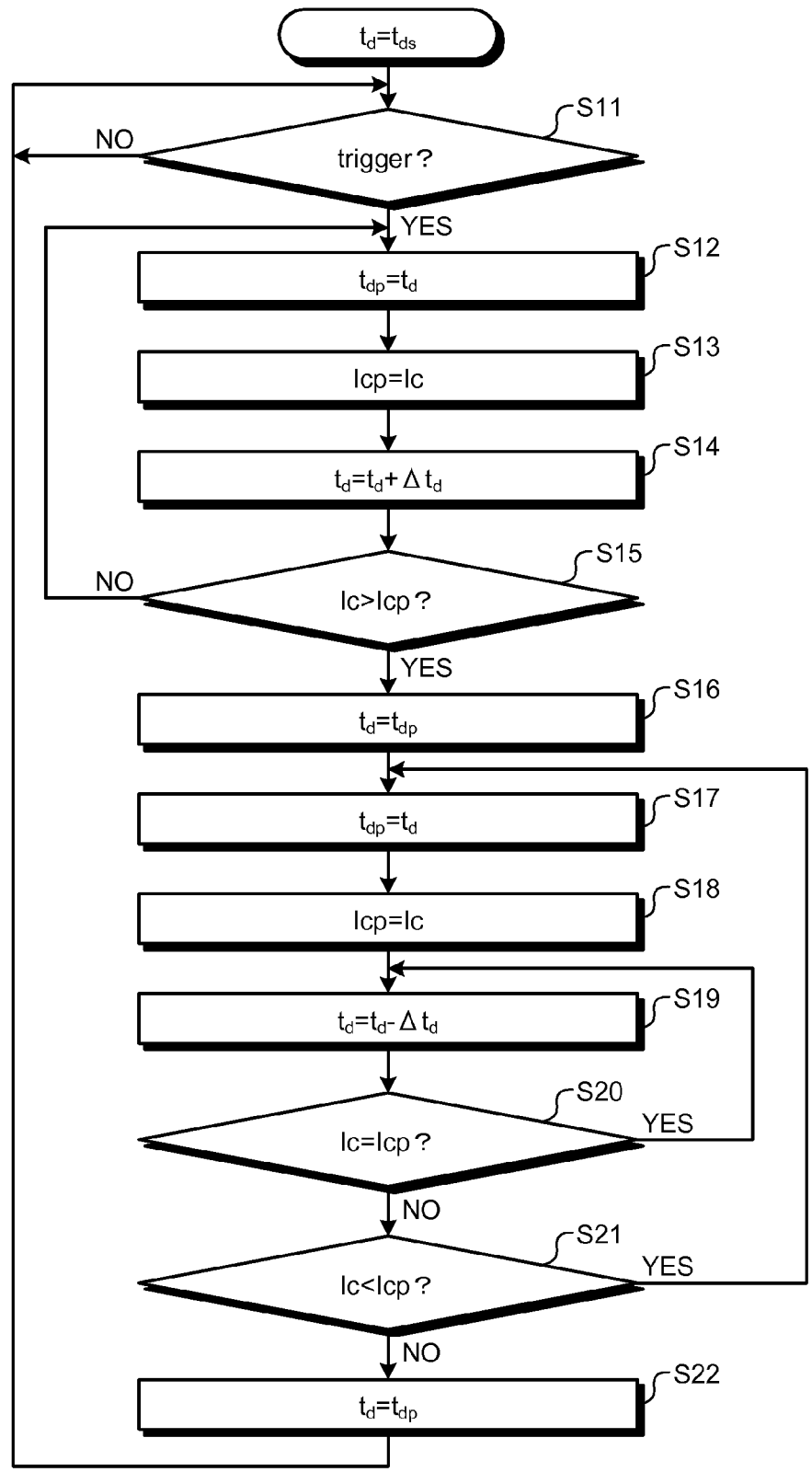
FIG. 11 is a flow chart showing an operation of optimizing a dead time in a power supply circuit according to a sixth embodiment.

FIG. 11 is a flow chart showing an operation of optimizing a dead time in a power supply circuit according to a sixth embodiment. Here, tds is an optimum value of the dead time td obtained at a previous time.

As shown in FIG. 11, the dead time td is set to the dead time tds. Then, at regular intervals or when a trigger indicating a load change is given in (S11), the dead time td is set to the optimum dead time tdp in (S12), and the current control value Ic is set to the optimum value Icp in (S13). Then, the dead time td is increased by a minute value Δtd in (S14), and a judgment is made as to whether the current control value Ic is larger than the optimum value Icp in (S15). If it is not larger, the flow returns to S12 and repeats the processes of S12 to S15. On the other hand, if the current control value Ic is larger than the optimum value Icp, the optimum dead time tdp is set for the dead time td in (S16), and the dead time td is set to the optimum dead time tdp in (S17). Then, the current control value Ic is set to the optimum value Icp in (S18), and the dead time td is reduced by the minute value Δtd in (S19).

Then, a judgment is made as to whether the current control value Ic is equal to the optimum value Icp in (S20), and, if it is equal, the flow returns to S19 and repeats the processes of S19 to S20. On the other hand, the current control value Ic is not equal to the optimum value Icp, a judgment is made as to whether the current control value Ic is smaller than the optimum value Icp in (S21), and, if it is smaller, the flow returns to S17 and repeats the processes of S17 to S21. On the other hand, if the current control value Ic is not smaller than the optimum value Icp, the dead time td is set to the optimum dead time tdp in (S22).

According to this method, when a trigger is given, a search can be started from an optimum value obtained at a previous time. Here, as can be seen in FIGS. 5 and 6, if the dead time td is too short, the conversion efficiency η is significantly lowered. Accordingly, for the sake of safety, the dead time td may take the maximum value within the range of the dead time td where the current control value Ic becomes minimum.

Seventh Embodiment

There may be adopted such a design that the dead time td1 from a fall of the control voltage vg1 to a rise of the control voltage vg2 is optimized in accordance with the method shown in FIG. 10 or 11 and then the dead time td2 from a fall of the control voltage vg2 to a rise of the control voltage vg1 is determined as td2=αtd1 (α is a constant).

Alternatively, there may be adopted such a design that td2 and αtd1 are set to be td2=αtd1 in advance and are simultaneously changed with their ratio fixed and the dead time td1 is optimized in accordance with the method shown in FIG. 10 or 11.

Alternatively, each of the dead times td1 and td2 may be individually optimized in accordance with the method shown in FIG. 10 or 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply circuit comprising:
a switching circuit; and
a switching control section configured to calculate a current control value based on a comparison result between a smoothed voltage of an output of the switching circuit and a target value, and to control a dead time of the switching circuit based on the current control value,
wherein the switching control section includes a dead time compensation circuit configured to control the dead time of the switching circuit so that the current control value becomes closer to a minimum value, wherein the dead time compensation circuit includes
a dead time search part configured to search for the dead time,
a current control value observation part configured to observe the current control value when the dead time is searched for, and
a current control value determination part configured to determine whether the current control value is minimum, based on a comparison result between the current control value observed at a previous time and the current control value observed at a present time.

2. The power supply circuit according to claim 1, wherein the switching control section is configured to control switching of the switching circuit based on a comparison result between the current control value and an output current output from the switching circuit.

3. The power supply circuit according to claim 2, wherein the switching control section is configured to calculate the current control value so that the smoothed voltage becomes closer to the target value.

4. The power supply circuit according to claim 1, wherein, when the dead time is changed, a minimum point of the current control value agrees with a maximum point of conversion efficiency.

5. The power supply circuit according to claim 1, further comprising:
a smoothing circuit configured to smooth an output current of the switching circuit.

6. The power supply circuit according to claim 1, wherein the dead time search part is configured to start searching for the dead time from a maximum value of the dead time, and to search for an optimum dead time while reducing the dead time by a minute value.

7. The power supply circuit according to claim 1, wherein the dead time search part is configured to start searching for the dead time from a previous optimum value of the dead time, and to search for an optimum dead time while increasing and/or reducing the dead time by a minute value.

8. The power supply circuit according to claim 1, wherein the switching control section includes
a digital compensator configured to calculate the current control value based on a comparison result between the smoothed voltage and the target value, and
a comparator configured to compare the current control value with an output current output from the switching circuit.

9. The power supply circuit according to claim 8, further comprising:
a ramp generation circuit configured to generate a ramp given to the current control value to be input to the comparator, and
an adder configured to add the ramp to the current control value.

10. The power supply circuit according to claim 8, wherein the digital compensator is configured to calculate the current control value based on a comparison result between the smoothed voltage and the target value.

11. The power supply circuit according to claim 10, wherein the digital compensator is configured to calculate the current control value so that the smoothed voltage becomes closer to the target value.

12. The power supply circuit according to claim 9, wherein the ramp generation circuit is configured to start giving the ramp to the current control value so that a time period, from a start point when the ramp is given to the current control value to a matching point when the current control value with the ramp given thereto becomes equal to the output current, depends only on a duty-cycle of the switching circuit.

13. The power supply circuit according to claim 2, comprising:
an A/D converter configured to A/D-convert the smoothed voltage; and
an error calculation circuit configured to calculate an error of an output voltage of the A/D-converted relative to a reference value,
wherein the digital compensator is configured to calculate the current control value so that the error becomes closer to 0.

14. The power supply circuit according to claim 8, comprising:
a flip-flop configured to be set based on a clock and to be reset based on an output of the comparator, thereby generating a pulse signal, and
a dead time addition circuit configured to add the dead time to the pulse signal.

15. The power supply circuit according to claim 5, wherein the switching circuit includes
a high-side switch configured to supply a current to the smoothing circuit from a direct current power supply, and
a low-side switch configured to pull a current in the smoothing circuit from ground.

16. The power supply circuit according to claim 15, comprising a driver configured to generate a PWM signal based on the pulse signal with the dead time added thereto, and to drive the high-side switch and the low-side switch.

17. A power supply circuit comprising:
a switching circuit;
a switching control section configured to calculate a current control value based on a comparison result between a smoothed voltage of an output of the switching circuit and a target value, and to control a dead time of the switching circuit based on the current control value; and
a smoothing circuit configured to smooth the output of the switching circuit,
wherein the switching control section includes a dead time compensation circuit configured to control the dead time of the switching circuit so that the current control value becomes closer to a minimum value,
wherein the switching circuit includes
a high-side switch configured to supply a current to the smoothing circuit from a direct current power supply, and
a low-side switch configured to pull a current in the smoothing circuit from ground,
wherein further comprising a driver configured to generate a PWM signal based on the pulse signal with the dead time added thereto, and to drive the high-side switch and the low-side switch, and
wherein the high-side switch is configured to be turned on after a lapse of a first dead time from a rise of the clock and to be turned off at detection of a matching point between an output current of the switching circuit and the current control value,
the low-side switch is configured to be turned off at the rise of the clock and to be turned on after a lapse of a second dead time from the detection of the matching point between an output current of the switching circuit and the current control value, and a start point when a ramp is given to the current control value is delayed by the first dead time from a time point when the low-side switch is turned off.

18. A power supply circuit comprising:

a switching circuit;

a switching control section configured to calculate a current control value based on a comparison result between a smoothed voltage of an output of the switching circuit and a target value, and to control a dead time of the switching circuit based on the current control value; and a smoothing circuit configured to smooth the output of the switching circuit, wherein the switching control section includes a dead time compensation circuit configured to control the dead time of the switching circuit so that the current control value becomes closer to a minimum value, wherein the switching circuit includes a high-side switch configured to supply a current to the smoothing circuit from a direct current power supply, and a low-side switch configured to pull a current in the smoothing circuit from ground, wherein further comprising a driver configured to generate a PWM signal based on the pulse signal with the dead time added thereto, and to drive the high-side switch and the low-side switch, and wherein the high-side switch is configured to be turned on at a rise of the clock and to be turned off at detection of a matching point between an output current of the switching circuit and the current control value, the low-side switch is configured to be turned on after a lapse of a second dead time from the detection of the matching point between an output current of the switching circuit and the current control value and to be turned off after a lapse of a difference between a switching cycle and a first dead time from the rise of the clock, and a start point when a ramp is given to the current control value is fixed without reference to the first dead time.

19. A power supply circuit comprising:

a switching circuit;

a switching control section configured to calculate a current control value based on a comparison result between a smoothed voltage of an output of the switching circuit and a target value, and to control a dead time of the switching circuit based on the current control value; and a smoothing circuit configured to smooth the output of the switching circuit, wherein the switching control section includes a dead time compensation circuit configured to control the dead time of the switching circuit so that the current control value becomes closer to a minimum value, wherein the switching circuit includes a high-side switch configured to supply a current to the smoothing circuit from a direct current power supply, and a low-side switch configured to pull a current in the smoothing circuit from ground, wherein further comprising a driver configured to generate a PWM signal based on the pulse signal with the dead time added thereto, and to drive the high-side switch and the low-side switch, and wherein the high-side switch is configured to be turned on after a lapse of a maximum value of a first dead time and to be turned off at detection of a matching point between an output current of the switching circuit and the current control value, the low-side switch is configured to be turned off after a lapse of a difference between the maximum value of the first dead time and the first dead time from the rise of the clock and to be turned on after a lapse of a second dead time from the detection of the matching point between an output current of the switching circuit and the current control value, and a start point when a ramp is given to the current control value is fixed without reference to the first dead time.

* * * * *